(12) United States Patent
Sun

(10) Patent No.: US 8,602,380 B2
(45) Date of Patent: Dec. 10, 2013

(54) MOUNTING DEVICE FOR FAN

(75) Inventor: Zheng-Heng Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 106 days.

(21) Appl. No.: 13/437,025

(22) Filed: Apr. 2, 2012

(65) Prior Publication Data
US 2013/0256502 A1 Oct. 3, 2013

(51) Int. Cl.
*H02K 7/20* (2006.01)

(52) U.S. Cl.
USPC ......... 248/675; 361/695; 361/697; 415/213.1

(58) Field of Classification Search
USPC .................. 248/675, 674; 361/694, 695, 697; 415/213.1
See application file for complete search history.

(56) References Cited

U.S. PATENT DOCUMENTS

| | | | | | |
|---|---|---|---|---|---|
| 4,834,615 | A | * | 5/1989 | Mauch et al. | 415/213.1 |
| 5,590,025 | A | * | 12/1996 | Clemens | 361/695 |
| 5,788,566 | A | * | 8/1998 | McAnally et al. | 454/184 |
| 6,017,185 | A | * | 1/2000 | Kuo | 415/177 |
| 6,311,766 | B1 | * | 11/2001 | Lin et al. | 165/80.3 |
| 6,392,885 | B1 | * | 5/2002 | Lee et al. | 361/697 |
| 7,684,191 | B1 | * | 3/2010 | Willis et al. | 361/695 |
| 2007/0053160 | A1 | * | 3/2007 | Chen | 361/695 |
| 2008/0253886 | A1 | * | 10/2008 | Chen | 415/213.1 |
| 2013/0216374 | A1 | * | 8/2013 | Sun | 415/213.1 |

* cited by examiner

*Primary Examiner* — Anita M King
(74) *Attorney, Agent, or Firm* — Altis Law Group, Inc.

(57) ABSTRACT

A mounting device for a fan includes a base board and a frame mounted on the base board. The fan includes two spaced boards. The frame includes a fixing board defining a vent, and a fixing piece extending from a bottom side of the fixing board, below the vent. A number of rods extend from the fixing board around the vent, to be engaged in one of the boards of the fan. A protrusion protrudes from a distal end of the fixing piece to block the other one of the boards of the fan.

7 Claims, 3 Drawing Sheets

MOUNTING DEVICE FOR FAN

BACKGROUND

1. Technical Field

The present disclosure relates to a device for fixing fans.

2. Description of Related Art

Many electronic devices use fans to cool internal electronic components. The fans may be mounted in an electronic device by a plurality of screws, which makes it difficult and time-consuming to replace or remove fans for repair.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
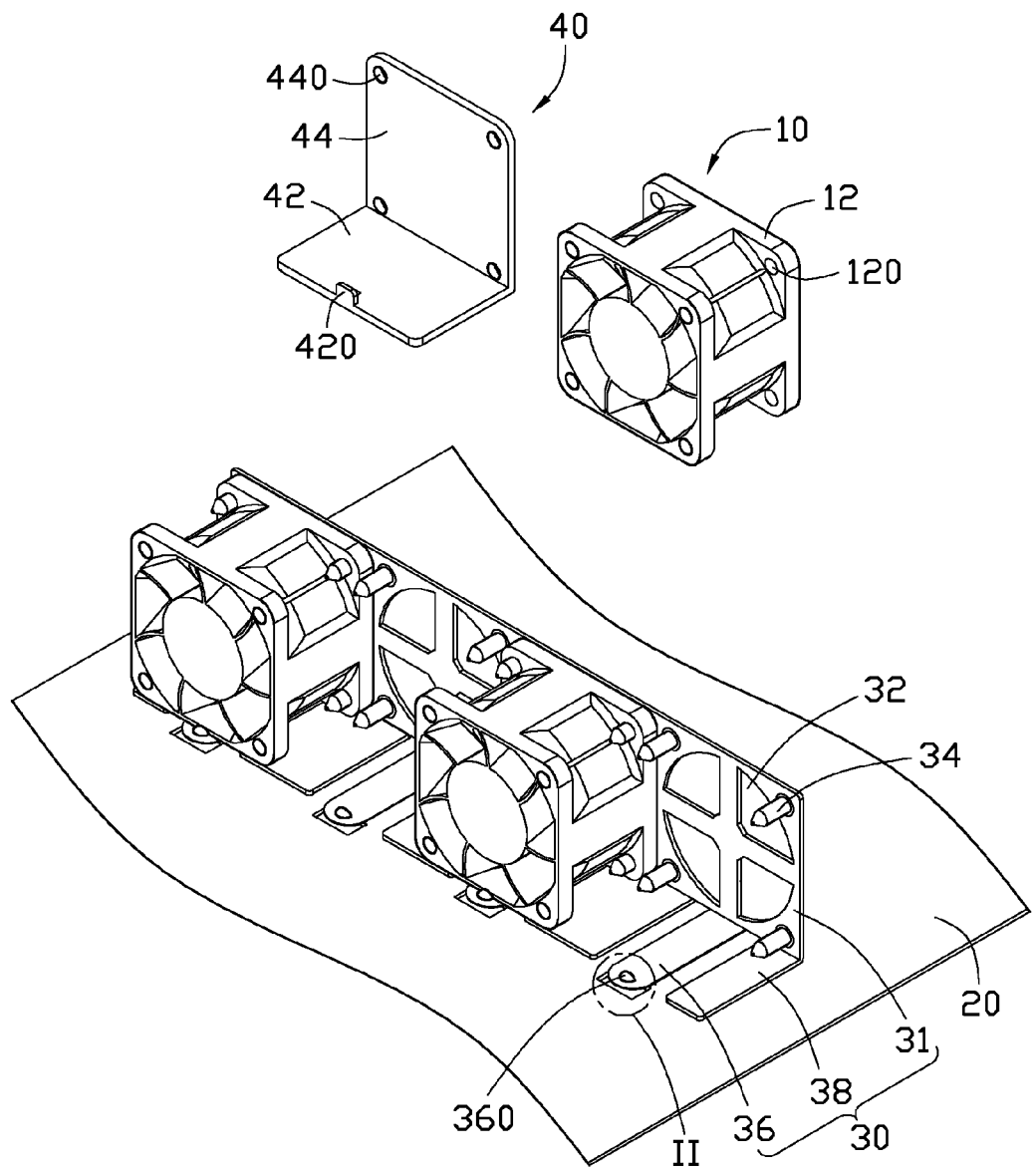
FIG. 1 is an exploded, isometric view of an exemplary embodiment of a mounting device for fans, together with a plurality of fans.
Figure 2:
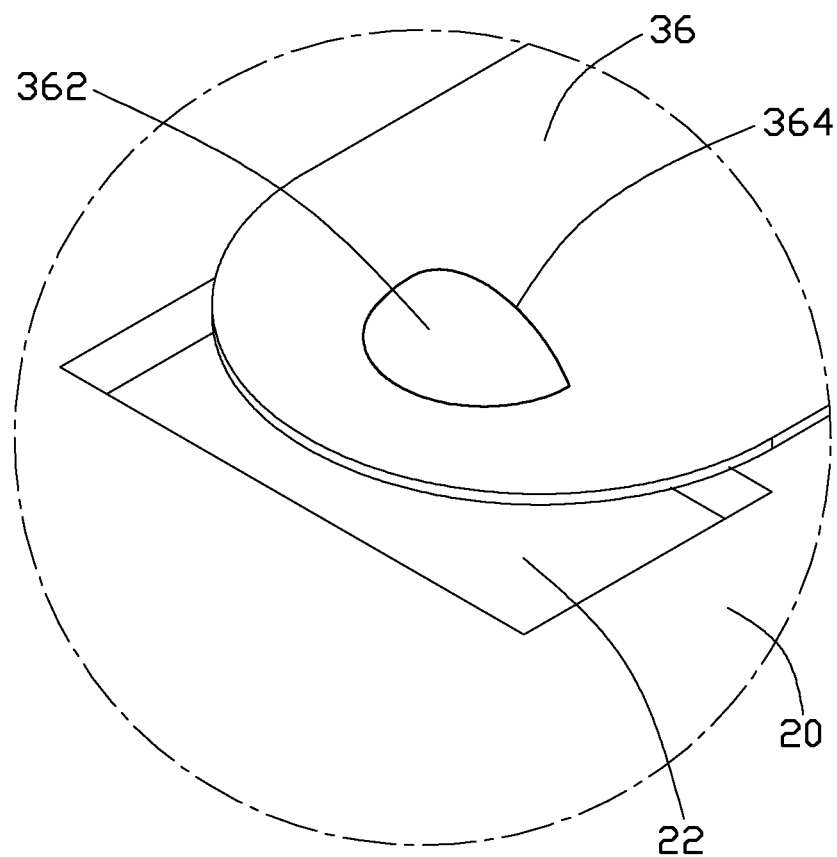
FIG. 2 is an enlarged view of the circled portion II of FIG. 1.

FIGS. 1 and 2 show an exemplary embodiment of a mounting device for fixing a plurality of fans 10. The mounting device includes a base board 20, a frame 30 mounted on the base board 20, and a plurality of air partition members 40.

Each fan 10 includes two spaced boards 12. Each board 12 defines four corner holes 120.

The frame 30 includes a rectangular fixing board 31 longitudinally defining a plurality of vents 32. Four rods 34 protrude from the fixing board 31, respectively adjacent to four corners of each vent 32. Each rod 34 has a tapered distal end. A plurality of fixing pieces 36 perpendicularly extends out from a bottom side of the fixing board 31, each fixing piece 36 aligned with a corresponding one of the vents 32. Two supporting pieces 38 perpendicularly extend from the bottom side of the fixing board 31, positioned at opposite sides of each fixing piece 36. A protrusion 360 protrudes up from a distal end of each fixing piece 36 opposite to the fixing board 31, and includes a curved guiding surface 362 slantingly extending down from a top of the protrusion 360 toward the distal end of the corresponding fixing piece 360, and a blocking surface 364 facing the fixing board 31 and substantially perpendicular to the base board 20.

The base board 20 defines a through hole 22 below the distal end of each fixing piece 36.

Each air partition member 40 includes a rectangular first plate 42, and a second plate 44 and an operation portion 420 perpendicularly extending up from opposite sides of the first plate 42. The second plate 44 defines four corner holes 440.

Figure 3:
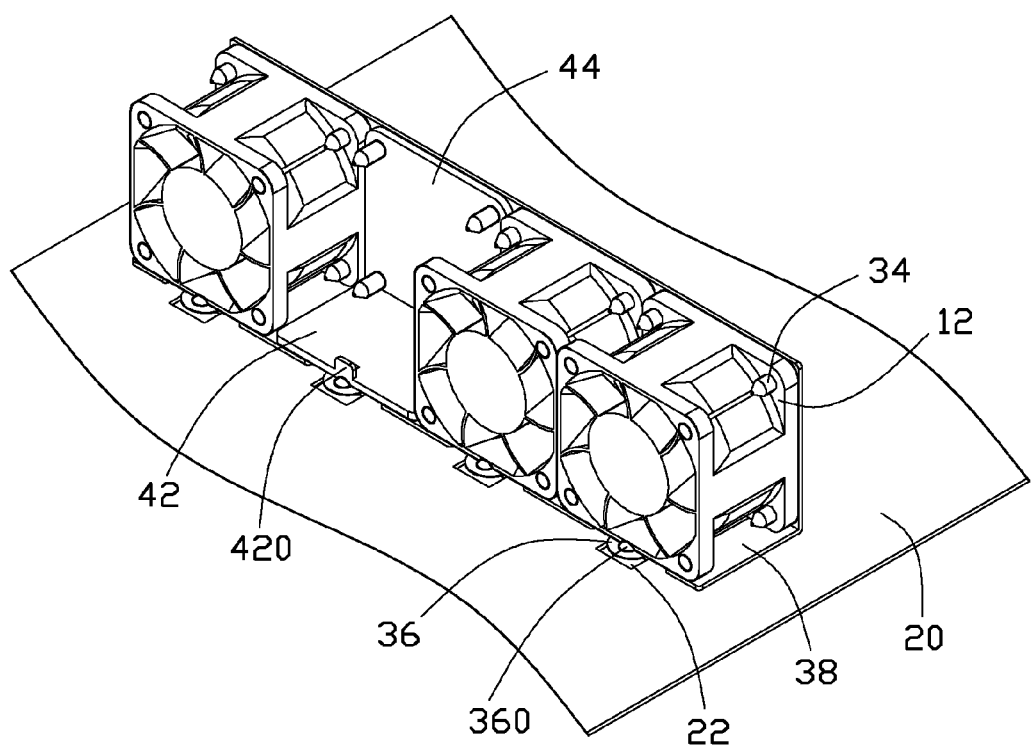
FIG. 3 is an assembled, isometric view of FIG. 1.

Referring to FIG. 3, in assembling each fan 10 to the frame 30, one of the boards 12 of the fan 10 faces one of the vents 32. The corner holes 120 of the board 12 are aligned with the rods 34 around the vent 32. The fan 10 is manipulated to move toward the fixing board 31. A bottom side of the other board 12 is slid along the guiding surface 362 of the corresponding protrusion 360 toward the fixing board 31, thus the distal end of the corresponding fixing piece 36 is deformed toward the corresponding through hole 22. After the rods 34 are engaged in the corresponding corner holes 120, and the bottom side of the other board 12 passes over the guiding surface 362, the fixing piece 36 is self-restored. Therefore, the other board 12 is blocked by the blocking surface 364. The fan 10 is fixed to the frame 30 and supported by the corresponding supporting pieces 38.

In disengaging one of the fans 10, the fixing piece 36 is deformed toward the through hole 22 to disengage the protrusion 360 from the corresponding board 12. The fan 10 is readily removed from the fixing board 31.

The air partition member 40 can cover a vent 32 when a corresponding fan 10 is taken off, to prevent inverted airflow. The rods 34 around the vent 32 are engaged in the corner holes 440. The first plate 42 is moved toward the base board 20, until the first plate 42 is sandwiched between the protrusion 36 and the fixing board 31. In disengaging the air partition member 40, the operation portion 420 is manipulated up or the fixing piece 36 is deformed toward the through hole 22, to disengage the protrusion 360 from the first plate 42. Therefore, the air partition member 40 is readily removed from the fixing board 31.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A mounting device for fixing a fan having two spaced boards, comprising:
   a base board; and
   a frame mounted on the base board, and comprising a fixing board defining a vent, and a fixing piece extending from a bottom side of the fixing board, below the vent, a plurality of rods protruding from the fixing board around the vent to be engaged in one of the boards of the fan, a protrusion protruding from a distal end of each fixing piece opposite to the fixing board to block the other board of the fan.

2. The mounting device of claim 1, wherein the protrusion comprising a curved guiding surface slantingly extending down from a top of the protrusion toward the distal end of the corresponding fixing piece, and a blocking surface facing the fixing board and substantially perpendicular to the base board to block the corresponding board of the fan.

3. The mounting device of claim 1, further comprising an air partition member, wherein the air partition member comprises a first plate defining a plurality of corner holes to receive the corresponding rods, in response to the fan not being fixed to the frame.

4. The mounting device of claim 3, wherein the air partition member further comprises a second plate perpendicularly extending from a bottom side of the first plate, to be sandwiched between the protrusion and the fixing board.

5. The mounting device of claim 4, wherein an operation portion perpendicularly extends up from a side of the second plate opposite to the first plate.

6. The mounting device of claim 1, wherein the base board defines a through hole, below the protrusion.

7. The mounting device of claim 1, wherein a plurality of supporting pieces perpendicularly extending from the bottom side of the fixing board to support the fan.

\* \* \* \* \*